United States Patent
Sabtu et al.

(10) Patent No.: US 10,045,519 B2
(45) Date of Patent: Aug. 14, 2018

(54) WASHER FOR FISHING REEL

(71) Applicant: Shimano Components (Malaysia) SDN. BHD., Pontian, Johor (MY)

(72) Inventors: Baihaki Bin Sabtu, Johor (MY); Abu Supian B. Ahmad, Johor (MY)

(73) Assignee: SHIMANO COMPONENTS (MALAYSIA) SDN. BHD., Pontian, Johor (MY)

( * ) Notice: Subject to any disclaimer, the term of this patent is extended or adjusted under 35 U.S.C. 154(b) by 347 days.

(21) Appl. No.: 15/057,564

(22) Filed: Mar. 1, 2016

(65) Prior Publication Data

US 2016/0295845 A1 Oct. 13, 2016

(30) Foreign Application Priority Data

Apr. 9, 2015 (JP) .................... 2015-079950

(51) Int. Cl.
| | | |
|---|---|---|
| *A01K 89/01* | (2006.01) | |
| *A01K 89/015* | (2006.01) | |
| *A01K 89/033* | (2006.01) | |
| *F16B 43/00* | (2006.01) | |

(52) U.S. Cl.
CPC ...... *A01K 89/0186* (2015.05); *A01K 89/0183* (2015.05); *A01K 89/059* (2015.05); *F16B 43/00* (2013.01)

(58) Field of Classification Search
CPC ......... F16B 43/00; F16B 43/003; F16B 43/02
See application file for complete search history.

(56) References Cited

U.S. PATENT DOCUMENTS

| | | | | | |
|---|---|---|---|---|---|
| 2,071,474 | A | * | 2/1937 | Schafer | A01K 89/0192 242/249 |
| 3,892,031 | A | * | 7/1975 | Bisbing | B23P 11/00 29/437 |
| 4,402,469 | A | * | 9/1983 | Stiner | A01K 89/027 242/245 |
| 6,669,419 | B1 | * | 12/2003 | Fleetwood | F16B 39/10 411/120 |
| 7,654,483 | B1 | * | 2/2010 | Martin | A01K 89/01909 242/303 |
| 9,856,904 | B2 | * | 1/2018 | Friedow | F16B 43/00 |
| 2005/0220567 | A1 | * | 10/2005 | Winker | F16B 37/00 411/533 |
| 2007/0248434 | A1 | * | 10/2007 | Wiley | F16B 7/187 411/160 |
| 2008/0041999 | A1 | * | 2/2008 | Nilsen | A01K 89/0111 242/246 |
| 2009/0014573 | A1 | * | 1/2009 | Kim | A01K 89/0184 242/255 |

(Continued)

FOREIGN PATENT DOCUMENTS

| | | | | |
|---|---|---|---|---|
| EP | 0619441 A1 | * | 10/1994 | ............... B32B 7/02 |
| JP | 2003023934 A | | 1/2003 | |

*Primary Examiner* — Emmanuel M Marcelo
(74) *Attorney, Agent, or Firm* — United IP Counselors, LLC

(57) ABSTRACT

A washer for a fishing reel can be attached to a rotary shaft so as to be unitarily rotated therewith. The washer includes a washer body and a first cut-and-raised part. The washer body includes a through hole in a middle part thereof. The through hole is defined by an inner wall surface including a first flat surface. The first cut-and-raised part includes the first flat surface.

17 Claims, 6 Drawing Sheets

(56) References Cited

U.S. PATENT DOCUMENTS

| | | | |
|---|---|---|---|
| 2010/0293870 A1* | 11/2010 | Amengual Pericas | E01F 15/0476 52/98 |
| 2011/0283480 A1* | 11/2011 | Chang | G06F 1/1681 16/333 |
| 2012/0206852 A1* | 8/2012 | Fitz | B60R 16/06 361/216 |
| 2013/0034377 A1* | 2/2013 | Friedow | F16B 5/0241 403/23 |
| 2014/0010616 A1* | 1/2014 | Meine | F16B 2/12 411/190 |
| 2014/0273665 A1* | 9/2014 | Haney | H01R 43/027 439/874 |
| 2017/0284432 A1* | 10/2017 | Ash | F16B 2/12 |

* cited by examiner

WASHER FOR FISHING REEL

CROSS-REFERENCE TO RELATED APPLICATIONS

This application claims priority to Japanese Patent Application No. 2015-079950, filed on Apr. 9, 2015, which is hereby incorporated by reference in its entirety.

BACKGROUND

Technical Field

The present description relates to a washer for a fishing reel.

Description of Background Information

Dual-bearing reels and spinning reels generally include a washer that is mounted to a rotary shaft to be unitarily rotatable therewith. For example, a dual-bearing reel described in Japan Laid-open Patent Application Publication No. 2003-23934 includes a washer configured to be unitarily rotated with a handle shaft (exemplary rotary shaft). The handle shaft is fitted into a through hole of the washer, and thus, the washer is configured to be unitarily rotated with the handle shaft. Specifically, an engaging surface of the handle shaft is engaged with an inner wall surface delimiting the through hole of the washer, and thus, the washer is configured to be unitarily rotated with the handle shaft.

The aforementioned washer receives a torque transmitted from the handle shaft through the inner wall surface thereof delimiting the through hole. It is herein preferable for the washer to have a small thickness from the perspective of a reduction in weight of, and enhancement of accuracy in stamping of, the washer as a component. However, when the washer actually has a small thickness, this results in a drawback that the inner wall surface of the washer is inevitably deformed by the torque transmitted thereto from the handle shaft.

BRIEF SUMMARY

It is an object of the present description to provide a washer that can receive a torque from a rotary shaft without being deformed.

A washer according to an aspect of the present description is a washer for a fishing reel, and is attached to a rotary shaft so as to be unitarily rotated therewith. The washer includes a washer body and a first cut-and-raised part. The washer body includes a through hole in a middle part thereof. The through hole is defined by an inner wall surface including a first flat surface. The first cut-and-raised part includes the first flat surface.

When the aforementioned washer is attached to the rotary shaft, the first cut-and-raised part is contacted to the rotary shaft. Therefore, compared to a washer not provided with the first cut-and-raised part, a washer according to the present description can be contacted to the rotary shaft over a larger area. As a result, even when thinly formed, a washer according to the present description can sufficiently receive a torque from the rotary shaft.

Preferably, the first cut-and-raised part extends in an opening direction of the through hole.

Preferably, the washer further includes a second cut-and-raised part. The inner wall surface includes a second flat surface. The second cut-and-raised part includes the second flat surface. According to this construction, the torque from the rotary shaft can be received by the first cut-and-raised part and the second cut-and-raised part. Hence, the washer is not deformed even when formed thinly as much as possible.

Preferably, the second cut-and-raised part extends in the same direction as the first cut-and-raised part.

Preferably, the second flat surface extends in parallel to the first flat surface.

Preferably, the washer body has a truncated cone shape.

Overall, a washer of the present description can receive the torque from the rotary shaft without being deformed.

BRIEF DESCRIPTION OF THE DRAWINGS

Referring now to the attached drawings which form a part of this original disclosure.

DETAILED DESCRIPTION OF EMBODIMENTS

A preferred embodiment of a dual-bearing reel equipped with a washer according to the present description will be hereinafter explained with reference to the attached drawings.

Figure 1:
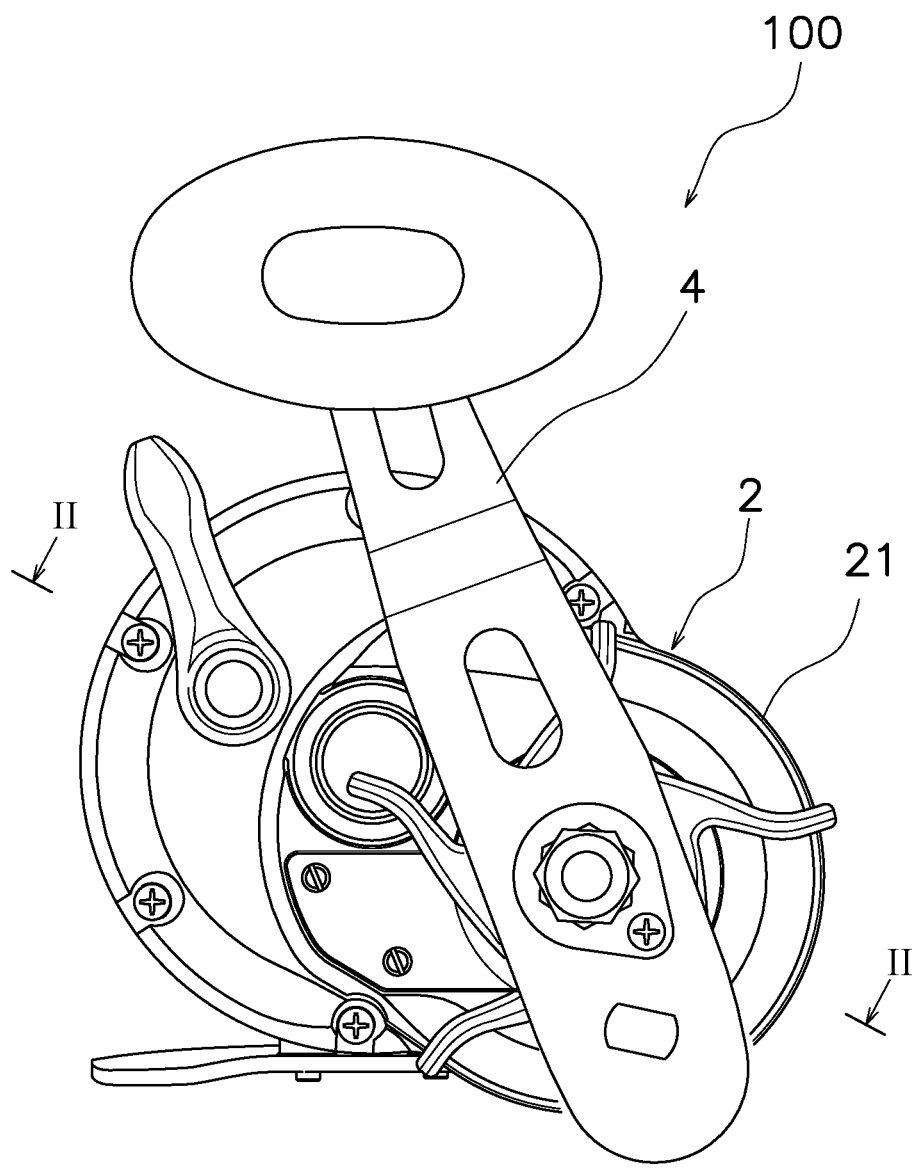
FIG. 1 is a side view of a dual-bearing reel.
Figure 2:
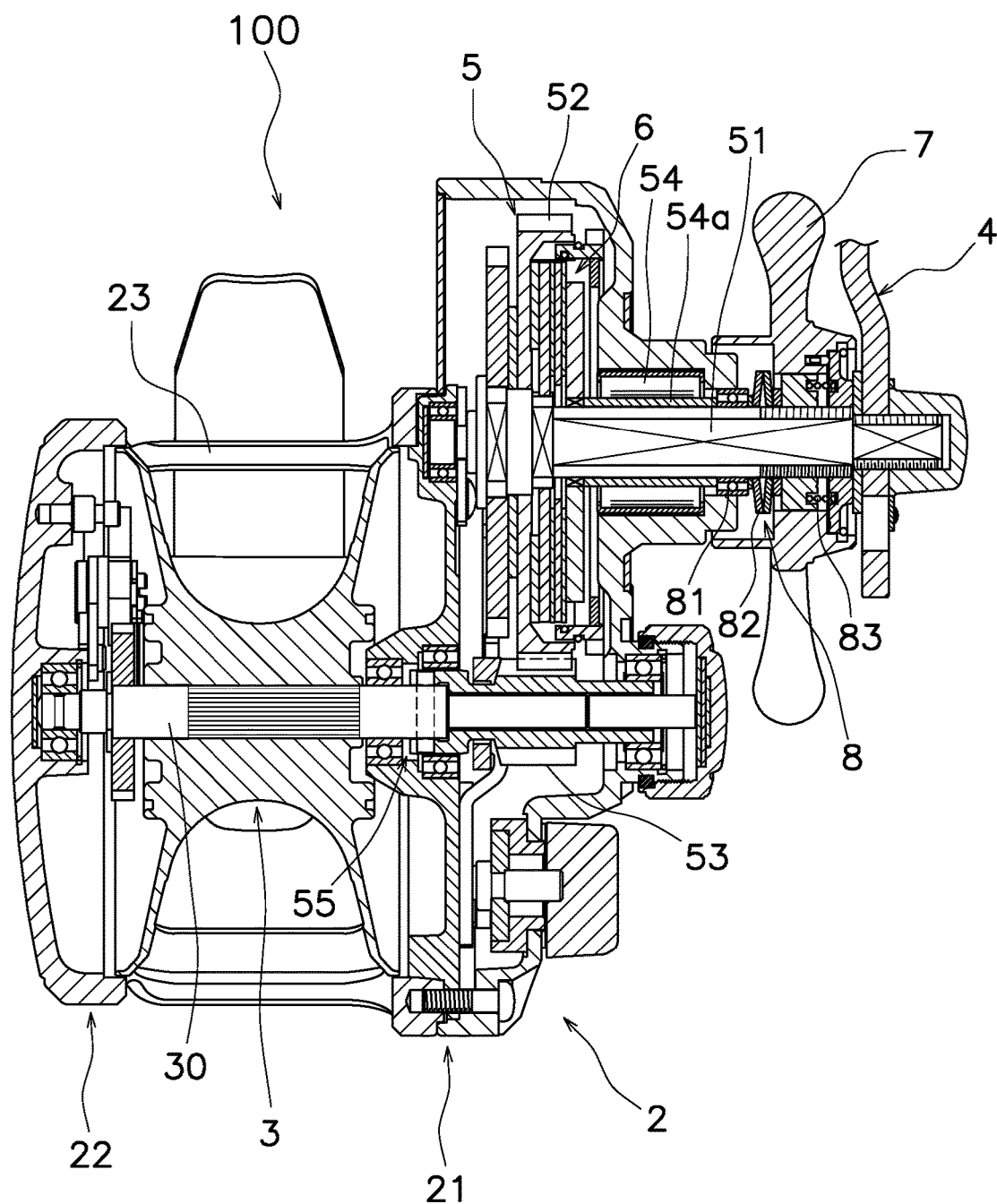
FIG. 2 is a cross-sectional view of FIG. 1 taken along line II-II.

As shown in FIGS. 1 and 2, a dual-bearing reel 100 includes a reel unit 2, a spool 3, a handle 4, a rotation transmission mechanism 5 and a drag mechanism 6.

As shown in FIG. 2, the reel unit 2 includes a first reel body 21 and a second reel body 22. The first reel body 21 and the second reel body 22 are disposed at an interval in a rotational axis direction. When described in detail, the first reel body 21 is disposed on the same side as a first end of the spool 3, whereas the second reel body 22 is disposed on the same side as a second end of the spool 3. The first reel body 21 and the second reel body 22 are coupled to each other through coupling parts 23.

The spool 3 is disposed between the first reel body 21 and the second reel body 22. A fishing line is wound onto the outer peripheral surface of the spool 3. The spool 3 is fixed to a spool shaft 30 and is configured to be unitarily rotated therewith. It should be noted that the spool shaft 30 extends between the first reel body 21 and the second reel body 22. The spool shaft 30 is rotatably supported by the first and second reel bodies 21 and 22 through bearing members and so forth.

The handle 4 is rotatably mounted to the first reel body 21. When described in detail, the handle 4 is attached to a third rotation stopper 51c (see FIG. 3) of a drive shaft 51 protruding from the first reel body 21. The rotation of the handle 4 is transmitted to the spool 3 through the rotation transmission mechanism 5.

The rotation transmission mechanism 5 is a mechanism configured to transmit the rotation of the handle 4 to the spool 3. The rotation transmission mechanism 5 is disposed in the internal space of the first reel body 21. When described in detail, the rotation transmission mechanism 5 includes the drive shaft 51, a drive gear 52 and a pinion gear 53.

Figure 3:
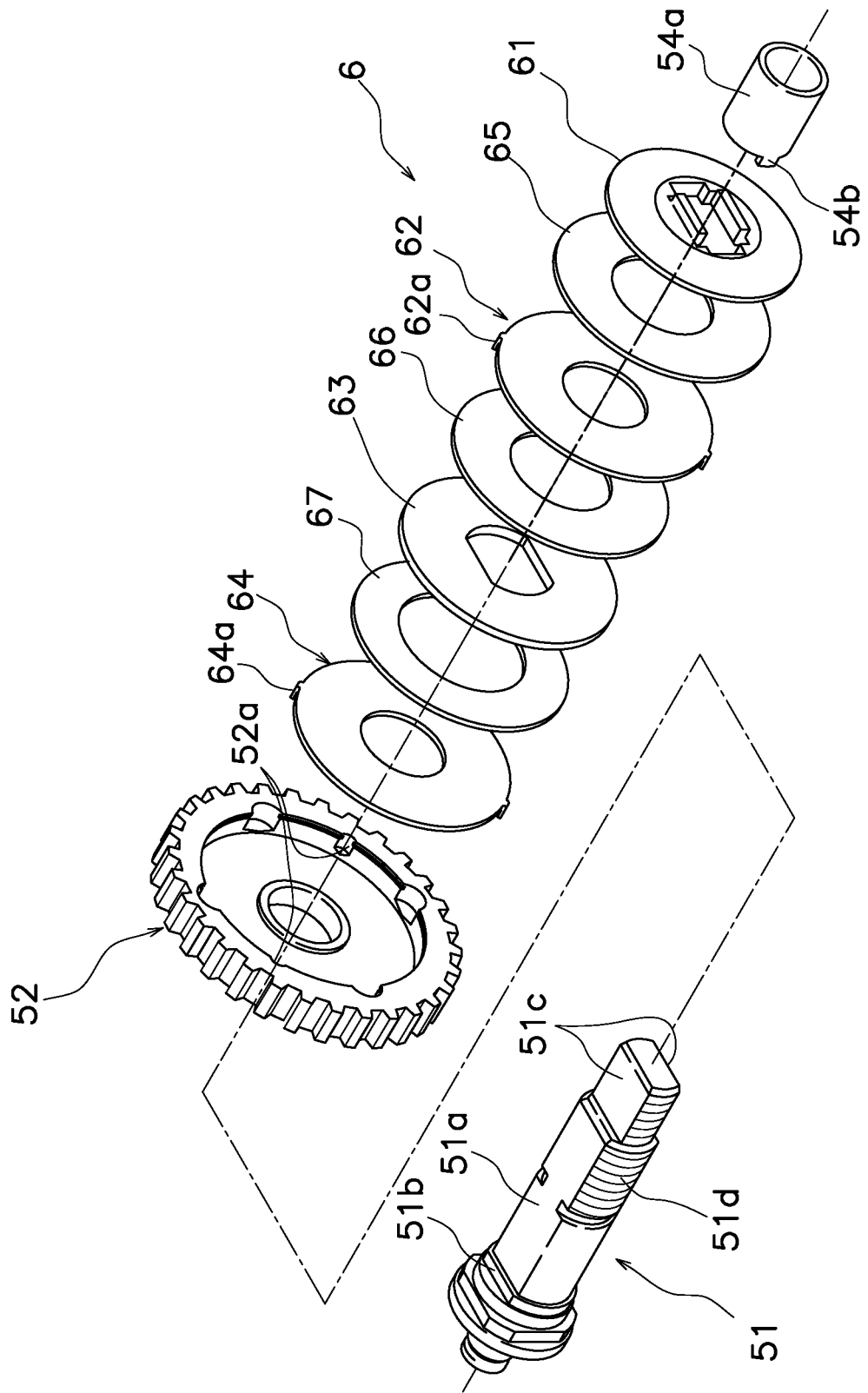
FIG. 3 is an exploded perspective view of a drag mechanism.

The drive shaft 51 is coupled to the handle 4, and is configured to be unitarily rotated therewith. It should be noted that the drive shaft 51 is prevented from rotating in a fishing-line releasing direction by a one-way clutch 54. As shown in FIG. 3, the drive shaft 51 includes first to third rotation stoppers 51a to 51c. Each of the rotation stoppers 51a to 51c is formed by a pair of flat surfaces extending in parallel to each other.

As shown in FIG. 2, the drive gear 52 is mounted to the drive shaft 51, and is configured to be unitarily rotated therewith. The pinion gear 53 is meshed with the drive gear 52. It should be noted that the pinion gear 53 has a tubular shape. The pinion gear 53 is configured to be coupled to the spool shaft 30 through a clutch mechanism 55. When the clutch mechanism 55 is engaged (clutch-on state), the pinion gear 53 and the spool shaft 30 are configured to be unitarily rotated. By contrast, when the clutch mechanism 55 is disengaged (clutch-off state), the pinion gear 53 and the spool shaft 30 are configured to be rotatable relatively to each other. For example, the clutch mechanism 55 is formed by an engaging pin and an engaging recess. The engaging pin radially penetrates the spool shaft 30. The engaging recess is formed on the pinion gear 53. The clutch-on state and the clutch-off state of the clutch mechanism 55 are switched in accordance with an axial movement of the pinion gear 53.

The drag mechanism 6 is a mechanism configured to brake a fishing-line releasing directional rotation of the spool 3. As shown in FIG. 3, the drag mechanism 6 includes a plurality of drag washers 61 to 64 and a plurality of lining members 65 to 67. The drag washers 61 to 64 and the lining members 65 to 67 are alternately disposed. In other words, each of the lining members 65 to 67 is disposed between an adjacent two of the drag washers 61 to 64.

The drag washers 61 to 64 are respectively mounted about the drive shaft 51. The first drag washer 61, the second drag washer 62, the third drag washer 63 and the fourth drag washer 64 are sequentially disposed in this order toward the drive gear 52. The first and third drag washers 61 and 63 are engaged with the drive shaft 51 and are configured to be unitarily rotated therewith. The second and fourth drag washers 62 and 64 are engaged with the drive gear 52, and are configured to be unitarily rotated therewith.

The drag washers 61 to 64 and the lining members 65 to 67 are respectively movable in an axial direction. The drag mechanism 6 is pressed toward the drive gear 52 by a pressing mechanism 8. With this pressing force, the drag washers 61 to 64 are frictionally engaged with each other through the lining members 65 to 67. As a result, a torque from the drive shaft 51 is transmitted to the drive gear 52 through the drag mechanism 6.

The first drag washer 61 (exemplary washer of the present description) is engaged with the drive shaft 51 (exemplary rotary shaft of the present description), and is configured to be unitarily rotated therewith. When described in detail, the first drag washer 61 is engaged with the first rotation stopper 51a of the drive shaft 51, and is configured to be unitarily rotated with the drive shaft 51. Additionally, the first drag washer 61 is configured to be rotated relatively to the drive gear 52.

Figure 4:
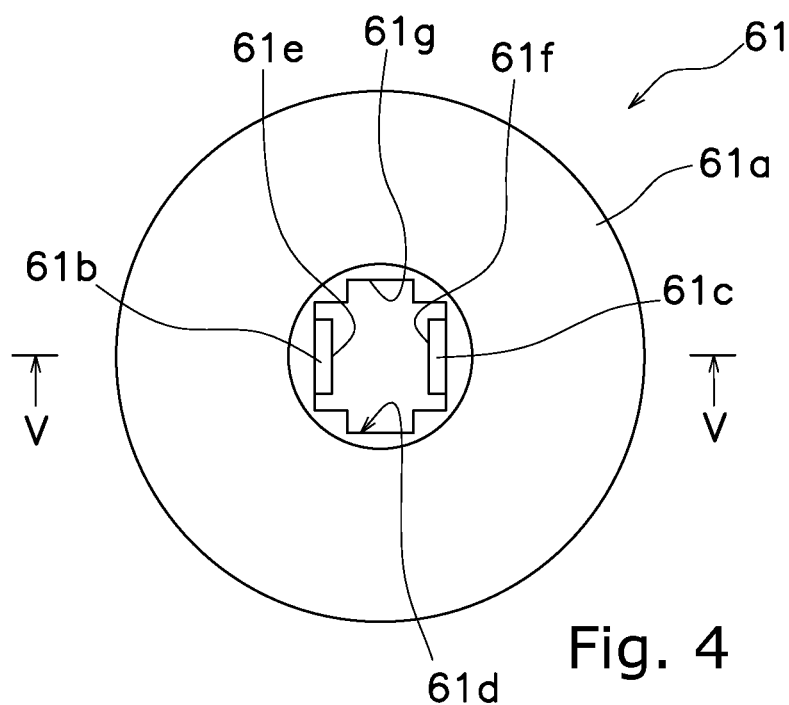
FIG. 4 is a plan view of a drag washer.
Figure 5:
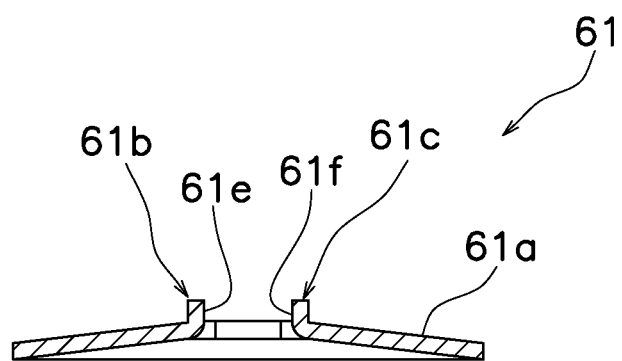
FIG. 5 is a cross-sectional view of FIG. 4 taken along line V-V.
Figure 6:
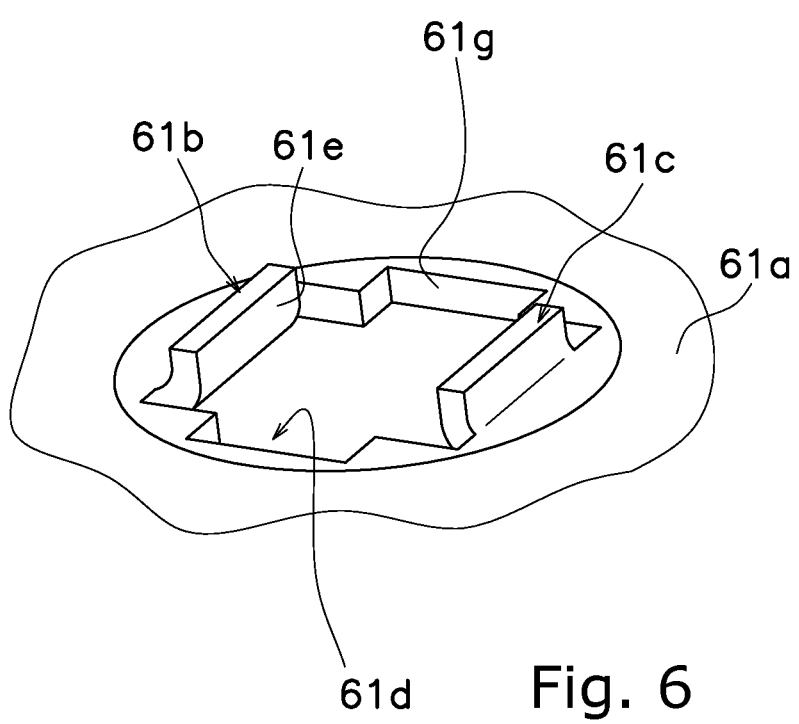
FIG. 6 is an enlarged perspective view of the drag washer.

As shown in FIGS. 4 to 6, the first drag washer 61 includes a washer body 61a, a first cut-and-raised part 61b and a second cut-and-raised part 61c. The washer body 61a has a disc shape, and includes a through hole 61d in the middle part thereof. An inner wall surface, defining the through hole 61d, includes a first flat surface 61e and a second flat surface 61f. In a plan view, the through hole 61d has a non-circular shape. Specifically, the through hole 61d has a roughly crisscross shape. The washer body 61a has a truncated cone shape.

The first and second cut-and-raised parts 61b and 61c are formed by cutting and raising part of the inner edge of the washer body 61a. The first and second cut-and-raised parts 61b and 61c extend in an opening direction (up-and-down direction in FIG. 5) of the through hole 61d. In other words, the first and second cut-and-raised parts 61b and 61c extend substantially perpendicularly from the washer body 61a. The first and second cut-and-raised parts 61b and 61c extend in the same direction. The first cut-and-raised part 61b includes the first flat surface 61e. Likewise, the second cut-and-raised part 61c includes the second flat surface 61f.

Figure 7:
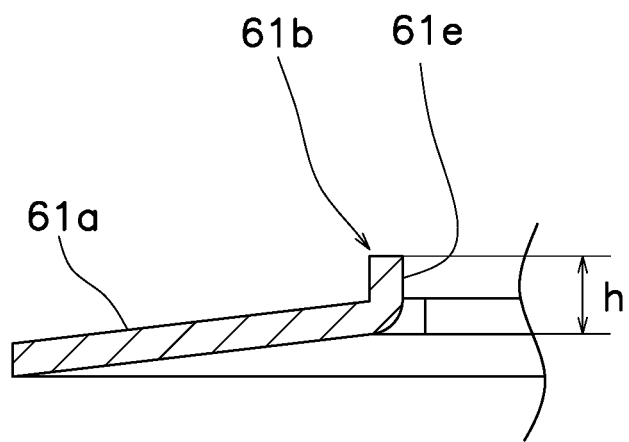
FIG. 7 is an enlarged view of FIG. 5.

The first cut-and-raised part 61b and the second cut-and-raised part 61c are disposed in opposition to each other. When described in detail, the first flat surface 61e of the first cut-and-raised part 61b and the second flat surface 61f of the second cut-and-raised part 61c are constructed to be faced to each other. When described in detail, the first flat surface 61e and the second flat surface 61f extend in parallel to each other. The first flat surface 61e and the second flat surface 61f are engaged with the first rotation stopper 51a of the drive shaft 51. Each of the first and second flat surfaces 61e and 61f has a height h greater than the thickness of the washer body 61a. It should be noted that the height h of each of the first and second flat surfaces 61e and 61f means an opening directional dimension of the through hole 61d. Specifically, as shown in FIG. 7, the height h means a height from the bottom surface of the washer body 61a. With this construction, the first drag washer 61 and the first rotation stopper 51a can be contacted over a large area.

Additionally, the first drag washer 61 is configured to be unitarily rotated with an inner race 54a of the one-way clutch 54. Specifically, as shown in FIG. 4, the through hole 61d of the first drag washer 61 includes a pair of engaging recesses 61g. The engaging recesses 61g of the pair are disposed in opposition to each other. Engaging protrusions 54b of the inner race 54a of the one-way clutch 54 are respectively engaged with the engaging recesses 61g. An engaging recess 61g is thus a means for engaging with a protrusion 54b of the inner race 54a. As a result, the first drag washer 61 is configured to be unitarily rotated with the inner race 54a of the one-way clutch 54.

As shown in FIG. 3, the third drag washer 63 is engaged with the drive shaft 51, and is configured to be unitarily rotated therewith. When described in detail, the third drag washer 63 is engaged with the second rotation stopper 51b of the drive shaft 51, and is configured to be unitarily rotated with the drive shaft 51. Additionally, the third drag washer 63 is configured to be rotated relatively to the drive gear 52.

The second and fourth drag washers 62 and 64 are configured to be unitarily rotated with the drive gear 52. Additionally, the second and fourth drag washers 62 and 64 are configured to be rotated relatively to the drive shaft 51. When described in detail, the second drag washer 62 includes a pair of engaging protrusions 62a on the outer peripheral edge thereof. The engaging protrusions 62a are respectively engaged with engaging recesses 52a of the drive gear 52. Accordingly, the second drag washer 62 is configured to be unitarily rotated with the drive gear 52. The fourth drag washer 64 includes a pair of engaging protrusions 64a on the outer peripheral edge thereof. The engaging protrusions 64a of the fourth drag washer 64 are also respectively engaged with the engaging recesses 52a of the drive gear 52. Accordingly, the fourth drag washer 64 is configured to be unitarily rotated with the drive gear 52.

A star drag 7 is a component for regulating a drag force of the drag mechanism 6. As shown in FIG. 2, the star drag 7 is configured to regulate the drag force of the drag mechanism 6 through the pressing mechanism 8. It should be noted that specifically, the pressing mechanism 8 includes the inner race 54a of the one-way clutch 54, a bearing member 81, a disc spring 82, a coil spring 83 and so forth. The star drag 7 is screwed onto a male threaded part 51d of the drive shaft 51. When the star drag 7 is rotated, the star drag 7 is moved in the axial direction. The pressing force of the pressing mechanism 8, applied to the drag mechanism 6, is configured to be changed in accordance with the movement of the star drag 7. As a result, the drag force of the drag mechanism 6 is configured to be regulated.

In the first drag washer 61 according to the aforementioned preferred embodiment, the first cut-and-raised part 61b is contacted to the drive shaft 51. Therefore, compared to a drag washer constructed such that the inner wall surface of the through hole 61d is contacted to the drive shaft 51, the drag washer 61 can be herein contacted to the drive shaft 51 over a larger area. As a result, even when thinly formed, the first drag washer 61 can sufficiently receive the torque from the drive shaft 51 without being deformed. Thus, the first cut-and-raised part 61b is a first means for receiving a torque without being deformed. Similarly, the second cut-and-raised part 61c is a second means for receiving a torque without being deformed.

Modifications

One preferred embodiment of the present description has been explained above. However, the present invention is not limited to the above, and a variety of changes can be made without departing from the scope of the present invention.

<Modification 1>

In the aforementioned preferred embodiment, the present description is directed to the first drag washer 61. However, the present description can be directed to the third drag washer 63. In other words, at least one cut-and-raised part can be formed by cutting and raising the inner edge of the washer body of the third drag washer 63.

<Modification 2>

In the aforementioned preferred embodiment, the present description is directed to the first drag washer 61 of the dual-bearing reel 100. However, the present description also can be directed to a drag washer of a spinning reel.

What is claimed is:

1. A washer for a fishing reel, the washer configured to be attached to a rotary shaft so as to be unitarily rotated therewith, the washer comprising:
   a washer body including a through hole in a middle part thereof, the washer body having a truncated cone shape, the through hole defined by an inner wall surface including a first flat surface; and
   a first cut-and-raised part including the first flat surface.

2. The washer according to claim 1, wherein the first cut-and-raised part extends in an opening direction of the through hole.

3. The washer according to claim 1, further comprising:
   a second cut-and-raised part, wherein
   the inner wall surface includes a second flat surface, and
   the second cut-and-raised part includes the second flat surface.

4. The washer according to claim 3, wherein the second cut-and-raised part extends in the same direction as the first cut-and-raised part.

5. The washer according to claim 3, wherein the second flat surface extends in parallel to the first flat surface.

6. The washer according to claim 1, wherein the through hole includes an engaging recess defined by a portion of the inner wall surface perpendicular to a portion of the inner wall surface including the first flat surface.

7. A washer for a fishing reel, the washer for attaching to a rotary shaft so as to be unitarily rotated therewith, the washer comprising:
   a washer body including a through hole in a middle part thereof, the washer body having a truncated cone shape; and
   first means for receiving a torque without being deformed.

8. The washer according to claim 7, wherein the first means extends in an opening direction of the through hole.

9. The washer according to claim 7, further comprising:
   second means for receiving a torque without being deformed.

10. The washer according to claim 9, wherein the second means extends in the same direction as the first means.

11. The fishing reel according to claim 7, wherein the through hole includes an engaging recess defined by a portion of an inner wall surface of the washer body perpendicular to a portion of the inner wall surface including the first means.

12. A fishing reel, comprising:
    a rotary shaft; and
    a washer attached to the rotary shaft so as to be unitarily rotated therewith, the washer including
       a washer body including a through hole in a middle part thereof, the washer body having a truncated cone shape, the through hole defined by an inner wall surface including a first flat surface contacting the rotary shaft; and
       a first cut-and-raised part including the first flat surface.

13. The fishing reel according to claim 12, wherein the first cut-and-raised part extends in an opening direction of the through hole.

14. The fishing reel according to claim 12, wherein the washer further comprises a second cut-and-raised part, the inner wall surface includes a second flat surface contacting the rotary shaft, and the second cut-and-raised part includes the second flat surface.

15. The fishing reel according to claim 14, wherein the second cut-and-raised part extends in the same direction as the first cut-and-raised part.

16. The fishing reel according to claim 14, wherein the second flat surface extends in parallel to the first flat surface.

17. The fishing reel according to claim 12, further comprising:
    a one-way clutch that prevents the rotary shaft from rotating in a fishing-line releasing direction, the one-way clutch including an inner race, the inner race including a protrusion, wherein the through hole includes an engaging recess to engage the protrusion.

* * * * *